TIME INDICATOR

Filed April 30, 1965

INVENTORS.
BERNARD T. MURPHY
DANIEL R. ZIMMERMAN
BY Lawrence I. Levinson
ATTORNEY United States Patent Office 3,263,647

Patented August 2, 1966

3,263,647

TIME INDICATOR

Bernard T. Murphy, Woodcliff Lake, and Daniel R. Zimmerman, Ridgewood, N.J., assignors, by mesne assignments, to E. R. Squibb & Sons, Inc., New York, N.Y., a corporation of Delaware Filed Apr. 30, 1965, Ser. No. 452,088
4 Claims. (Cl. 116—133)

This invention relates to a new time indicator and more particularly to a time indicator for use in radiology.

In diagnostic radiology, such as urography and cholecystography, it is sometimes necessary to take a sequence of pictures at spaced intervals in order to determine whether an organ is functioning normally. This results in a plurality of X-ray films that must be read in the proper order to be meaningful. Various devices and techniques have been devised to assure that such films are read in the correct order. The present invention relates to an improved device for determining the order of such films.

It is an object of this invention, therefore, to provide an improved time indicator for use in radiology.

It is another object of this invention to provide an inexpensive, accurate time indicator that can be used to record directly on an X-ray film the time the film was exposed in relation to other films exposed in the same series.

These objects are achieved by the device of this invention, a preferred embodiment of which is illustrated in the accompanying drawing wherein.

Figure 1:
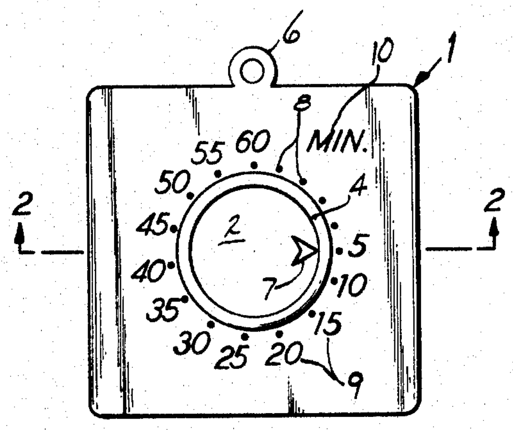
FIGURE 1 is a top plan view of the time indicator of this invention.
Figure 2:
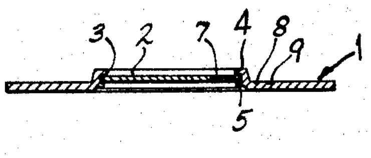
FIGURE 2 is a cross sectional view of the indicator shown in FIGURE 1, taken along the line 2—2.

Considering the drawing, the time indicator of this invention comprises generally a plate 1 and a disk 2, rotationally mounted therein. Although plate 1 is shown as square in the drawing, it may be of any desired shape, such as rectangular. The plate 1 is fabricated with a centrally located circular aperture 3 for receiving disk 2. Disk 2 is rotationally retained in aperture 3 by means of a pair of spaced circular flanges 4 and 5 projecting centrally from plate 1. Plate 1 may also be provided with an apertured ear 6 for hanging the indicator when not in use.

The plate 1 and disk 2 are preferably of substantially the same thickness and are fabricated from a material relatively opaque to X-rays at such thickness. Although any material fulfilling these requirements may be used, the plate and disk are preferably metal, such as brass.

Impressed into disk 2, near its circumference, is an arrow 7 or other indicia. Spaced around flange 4 on plate 1 are a number of indents 8, adjacent to some of which are impressed numerals 9. Also impressed into plate 1 are the letters "MIN" 10 to show the unit of time (minutes) being indicated. All of the indicia (the arrow 7, the indents 8, the numerals 9 and the letters 10) are of sufficient thinness to be relatively transparent to X-rays. The maximum thickness of this indicia will depend, of course, on the materials from which plate 1 and disk 2 are fabricated, their density, the voltage and amperage of the X-ray used and the time of exposure.

By way of example, if the indicator is fabricated of gold plated brass, a thickness of at least 0.05 inch is sufficient to assure radiopacity for plate 1 and disk 2, if an X-ray of about 50–60 kilovolts is used for a period of time about 0.05 to 0.5 second at an amperage of about 50–200 milliamperes. Moreover, to assure relative transparency for the indicia under these conditions they should be of a thickness no greater than about 0.03 inch.

In use, when the first X-ray is to be taken, the indicator is set so that the arrow 7 points between the numeral "60" and the first indent to its right. The indicator is then placed between the X-ray generator and the film to be exposed and the first X-ray is taken. The indicator will appear as a transparent or light grey image on the X-ray film, except where there are indicia, which will reproduce as black or dark grey images. When time for the next exposure is reached, the disk 2 is rotated so that the arrow 7 points to the correct time (say "5" for five minutes between first and second exposures) and the procedure is repeated.

Surprisingly, it has been found that the indicator of this invention gives a clear picture, for if the indicia are completely punched out, only a blurred image, difficult to read, is formed.

This invention may be variously otherwise embodied within the scope of the appended claims.

What is claimed is:

1. A time indicator for radiology, which comprises a plate having a disk rotationally mounted therein, said plate having impressions therein to define indicia and said disk having an impression defining a datum mark therein near the circumference thereof, and said impressions and impression being of sufficient thinness to be relatively transparent to X-rays, and the remaining portions of said plate and disk being of sufficient thickness to be relatively opaque to X-rays.

2. A time indicator for radiology, which comprises a plate having a centrally located circular aperture therein, a disk rotationally mounted in said aperture and retained therein by means of a pair of spaced circular flanges, said plate having a plurality of spaced impressions therein adjacent one of said flanges, said disk having an arrow-shaped impression therein adjacent the circumference of said disk, said spaced impressions and arrow-shaped impression being of sufficient thinness to be relatively transparent to X-rays, and the remaining portions of said plate and disk being of sufficient thickness to be relatively opaque to X-rays.

3. A time indicator for radiology, which comprises a metallic plate having a centrally located circular aperture therein, a metallic disk rotationally mounted in said aperture and retained therein by means of a pair of spaced circular flanges on said plate, said plate having a plurality of spaced indents therein adjacent one of said flanges and a plurality of impressed numerals adjacent certain of said indents, said disk having an arrow-shaped impression therein adjacent the circumference of said disk, said impression and indents being of sufficient thinness to be relatively transparent to X-rays and the remaining portions of said plate and disk being of sufficient thickness to be relatively opaque to X-rays.

4. The indicator device of claim 3, wherein the metal is brass, the plate and disk have a thickness of at least about 0.05 inch.

References Cited by the Examiner

UNITED STATES PATENTS 2,939,958 6/1960 Anderson ---------- 250—67

FOREIGN PATENTS 465,726 9/1951 Italy.

LOUIS J. CAPOZI, *Primary Examiner.*